United States Patent
Atungsiri et al.

(10) Patent No.: US 11,979,948 B2
(45) Date of Patent: *May 7, 2024

(54) METHODS, WIRELESS COMMUNICATIONS NETWORKS AND INFRASTRUCTURE EQUIPMENT

(71) Applicant: Sony Group Corporation, Tokyo (JP)

(72) Inventors: Samuel Asangbeng Atungsiri, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,741

(22) Filed: Dec. 19, 2022

(65) Prior Publication Data

US 2023/0123661 A1 Apr. 20, 2023

Related U.S. Application Data

(63) Continuation of application No. 17/046,325, filed as application No. PCT/EP2019/059546 on Apr. 12, 2019, now Pat. No. 11,533,778.

(30) Foreign Application Priority Data

Apr. 13, 2018 (EP) .................................. 18167380

(51) Int. Cl.
*H04W 88/18* (2009.01)
*H04B 7/26* (2006.01)
(Continued)

(52) U.S. Cl.
CPC ........ *H04W 88/182* (2013.01); *H04B 7/2606* (2013.01); *H04L 27/2613* (2013.01); *H04W 88/04* (2013.01)

(58) Field of Classification Search
CPC .................................................. H04W 88/182
See application file for complete search history.

(56) References Cited

U.S. PATENT DOCUMENTS 8,755,324 B2 * 6/2014 Yu ........................ H04W 72/542
455/450
2018/0092139 A1 * 3/2018 Novlan ................. H04W 76/12
(Continued)

OTHER PUBLICATIONS

International Search Report and Written Opinion dated Jun. 5, 2019 for PCT/EP2019/059546 filed on Apr. 12, 2019, 15 pages.
(Continued)

*Primary Examiner* — Guang W Li
(74) *Attorney, Agent, or Firm* — XSENSUS LLP

(57) ABSTRACT

A method of controlling communications within a wireless communications network is provided. The method comprises receiving, at a first infrastructure equipment acting as a donor node connected to a core network part of a wireless communications network, signals representing data from one or more others of infrastructure equipment, the data having been received at the one or more others of the infrastructure equipment from one or more communications devices or from other infrastructure equipment, and transmitting, by the first infrastructure equipment, the data from the one or more others of the infrastructure equipment to the core network part of the wireless communications network. At least one of the infrastructure equipment uses at least one spectral efficiency enhancing technique to receive the signals, the at least one spectral efficiency enhancing technique allowing the at least one infrastructure equipment to receive the signals in the backhaul communications link.

20 Claims, 9 Drawing Sheets

(51) Int. Cl.
*H04L 27/26* (2006.01)
*H04W 88/04* (2009.01)

(56) References Cited

U.S. PATENT DOCUMENTS

| | | | |
|---|---|---|---|
| 2018/0270875 A1 | 9/2018 | Hampel et al. | |
| 2019/0110209 A1* | 4/2019 | Senior | H04W 72/046 |
| 2019/0141762 A1* | 5/2019 | Novlan | H04B 7/15507 |
| 2019/0215055 A1* | 7/2019 | Majmundar | H04W 40/22 |
| 2019/0223002 A1* | 7/2019 | Novlan | H04W 72/20 |
| 2020/0068567 A1* | 2/2020 | Islam | H04W 72/0446 |
| 2020/0275499 A1 | 8/2020 | Novlan et al. | |
| 2021/0329518 A1 | 10/2021 | Sharma et al. | |
| 2021/0400540 A1 | 12/2021 | Kim et al. | |
| 2022/0116850 A1* | 4/2022 | Ahn | H04W 88/04 |

OTHER PUBLICATIONS

AT&T, "Use cases and deployment scenarios for IAB", 3GPP TSG-RAN WG2 NR Ad hoc 1801, R2-1801214, Vancouver, Canada, Jan. 22-26, 2018, pp. 1-5.
Huawei et al., "Consideration on IAB physical layer enhancement", 3GPP TSG RAN WG1 Meeting No. 91, R1-1720606, Reno, USA, Nov. 27-Dec. 1, 2017, 7 pages.
Sony, "NR Enhancements to support Integrated Access Backhaul", 3GPP TSG RAN WG1 Meeting No. 92bis, R1-1804611, Sanya, PRC, Apr. 16-20, 2018, 3 pages.
Qualcomm Inc, KDDI, AT&T, Nokia, Nokia Shanghai Bell, Huawei, Ericsson, Intel, LG Electronics, CMCC, Samsung, Way Forward—IAB Architecture for L2/3 relaying, 3GPP TSG-RAN WG3 Meeting #99bis, R3-181944, Sanya, PRC, Apr. 16-20, 2018, 6 pages.
Qualcomm, AT&T, KDDI, Ericsson, Nokia, Nokia Shanghai Bell, Intel, Samsung, Huawei, Proposals on IAB Architecture, 3GPP TSG-RAN WG2 NR Ad hoc 1801, R2-1801606, Vancouver, Canada, Jan. 22-Jan. 26, 2018, Agenda Item: 11.1, 7 pages.
AT&T, Qualcomm, Samsung, New SID Proposal: Study on Integrated Access and Backhaul for NR, 8881123GPP TSG RAN Meeting #75, RP-170821, Dubrovnik, Croatia, Mar. 6-9, 2017, 5 pages.
3GPP TS 38.211 V15.1.0, 3rd Generation Partnership Project, Technical Specification Group Radio Access Network, NR, Physical channels and modulation (Release 15), Mar. 2018, 90 pages.
3GPP TS 38.214 V15.1.0, 3rd Generation Partnership Project, Technical Specification Group Radio Access Network, NR, Physical layer procedures for data, (Release 15); Mar. 2018, 9 pages.
Huawei, HiSilicon, Revised work item proposal: Enhancements of NB-IoT, 3GPP TSG RAN Meeting #73, RP-161901, New Orleans, USA, Sep. 19-22, 2016, 8 pages.
Holma, H., and Toskala, A., "LTE for UMTS: OFDMA and SC-FDMA Based Radio Access," John Wiley & Sons, td., 2010, 8 pages.
3GPP TR 26.918, V15.2.0, "3rd Generation Partnership Project; Technical Specification Group Services and System Aspects; Virtual Reality (VR) media services over 3GPP (Release 15)", Mar. 2018, total 119 pages.
3GPP TS 26.238, V15.0.0, "3rd Generation Partnership Project; Technical Specification Group Services and System Aspects; Uplink Streaming (Release 15)", Dec. 2017, total 32 pages.

* cited by examiner

METHODS, WIRELESS COMMUNICATIONS NETWORKS AND INFRASTRUCTURE EQUIPMENT

CROSS-REFERENCE TO RELATED APPLICATIONS

The present application is a continuation of U.S. application Ser. No. 17/046,325, filed Oct. 9, 2020, which is based on PCT filing PCT/EP2019/059546, filed Apr. 12, 2019, which claims priority to EP 18167380.7, filed Apr. 13, 2018, the entire contents of each are incorporated herein by reference.

BACKGROUND

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need to ensure that a donor infrastructure equipment that is physically connected to the core network does not suffer from a "capacity crunch" when a large amount of data is being transmitted from various communications devices and infrastructure equipment to the core network via the donor infrastructure equipment.

SUMMARY OF THE DISCLOSURE

The present disclosure can help address or mitigate at least some of the issues discussed above as defined in the appended claims.

Embodiments of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises receiving, at a first of the infrastructure equipment acting as a donor node connected to a core network part of the wireless communications network, signals representing data from one or more others of the infrastructure equipment, the data having been received at the one or more others of the infrastructure equipment from one or more of the communications devices or from other infrastructure equipment, and transmitting, by the first infrastructure equipment, the data from the one or more others of the infrastructure equipment to the core network part of the wireless communications network. At least one of the infrastructure equipment uses at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
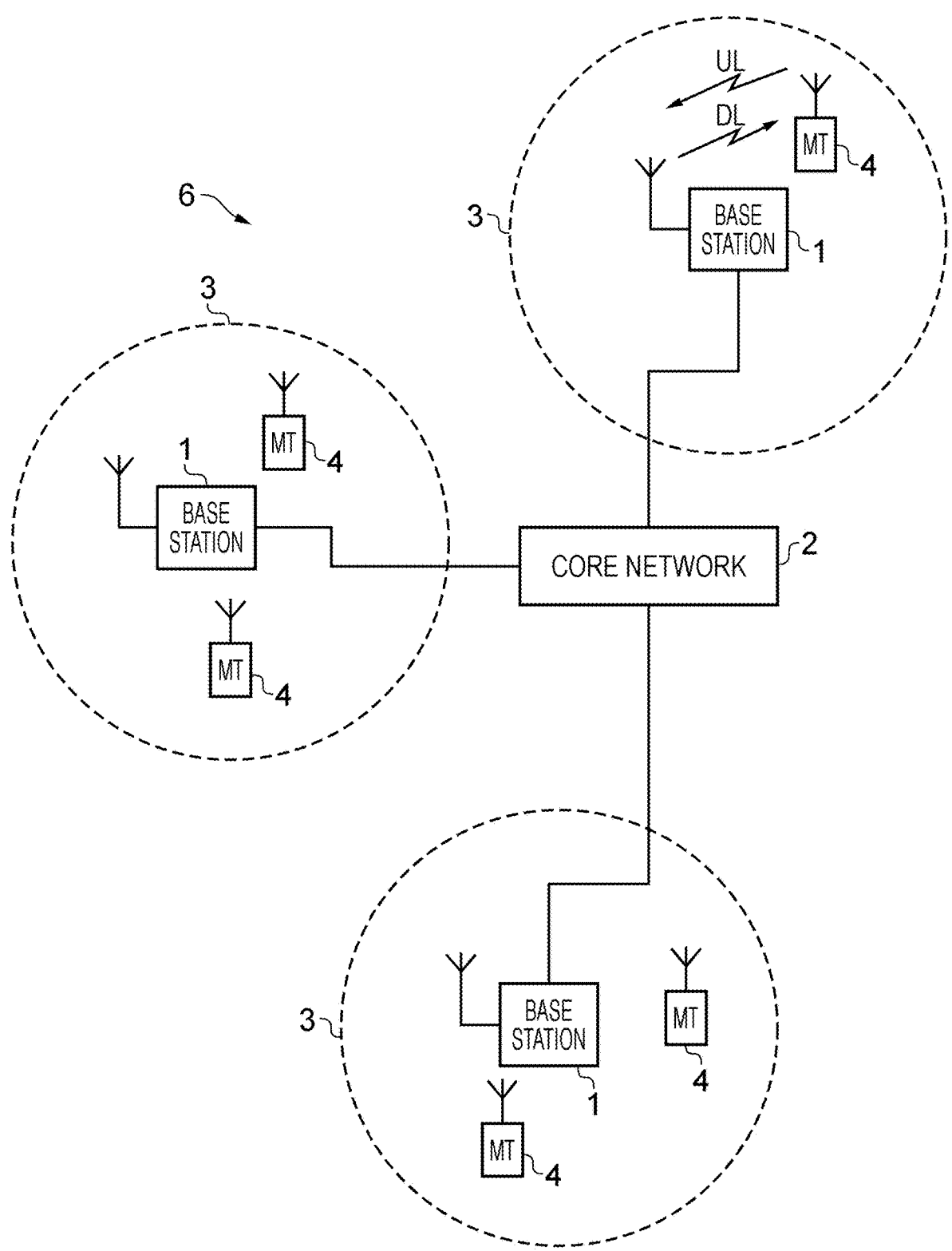
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
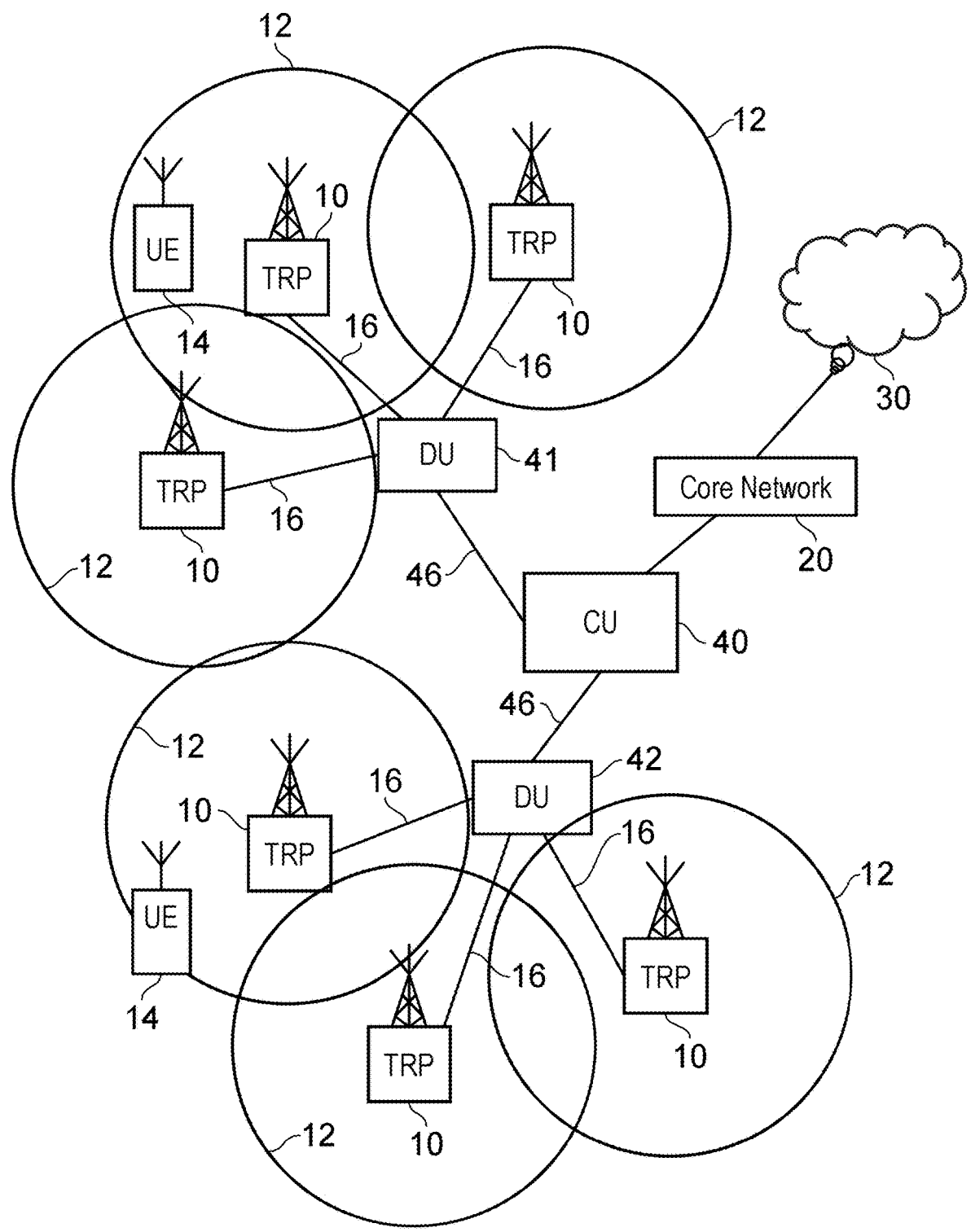
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
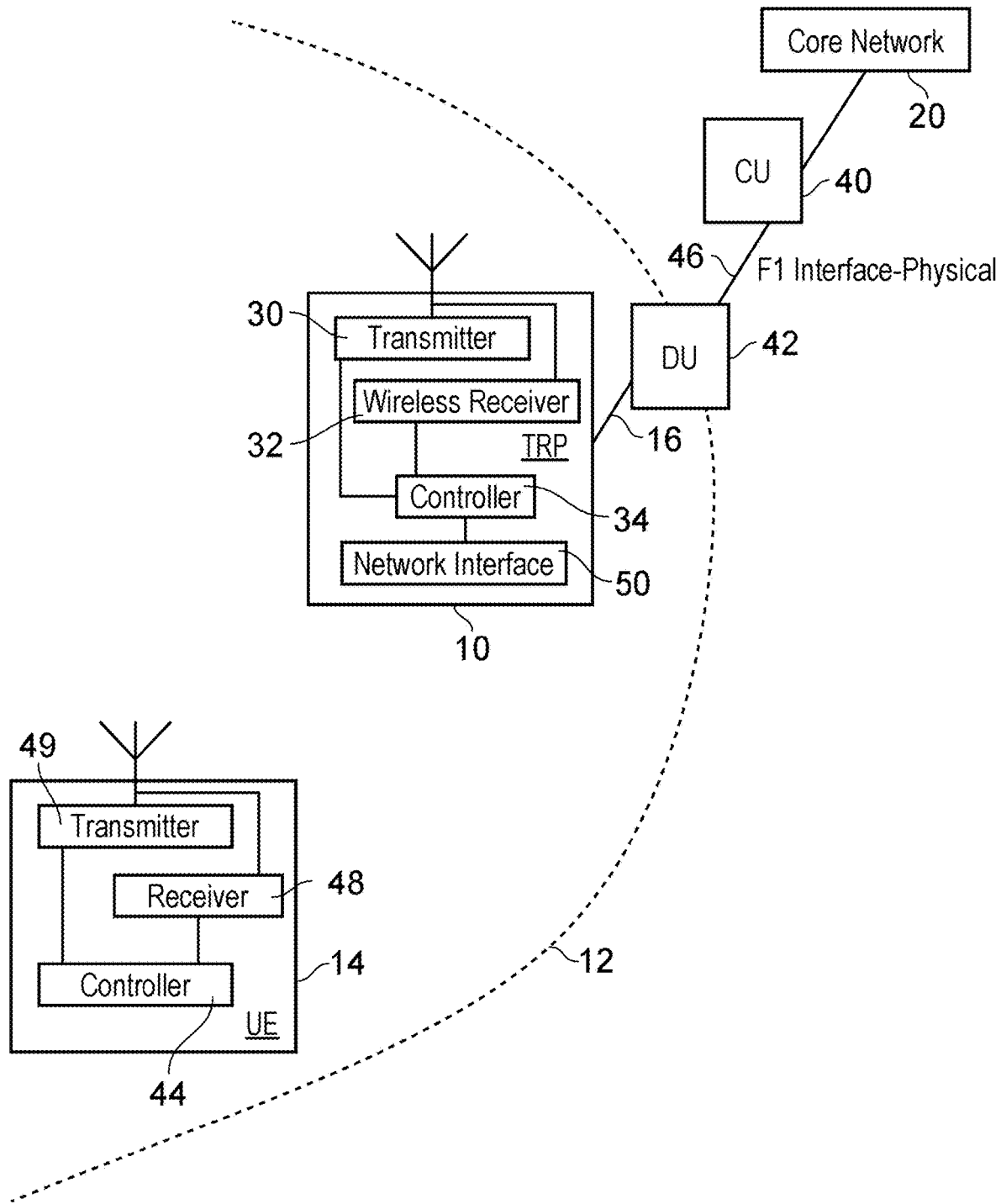
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49, the receivers 32, 48 may include radio frequency filters and amplifiers as well as signal processing components and devices in order to transmit and receive radio signals in accordance for example with the 5G/NR standard. The controllers 34, 44 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
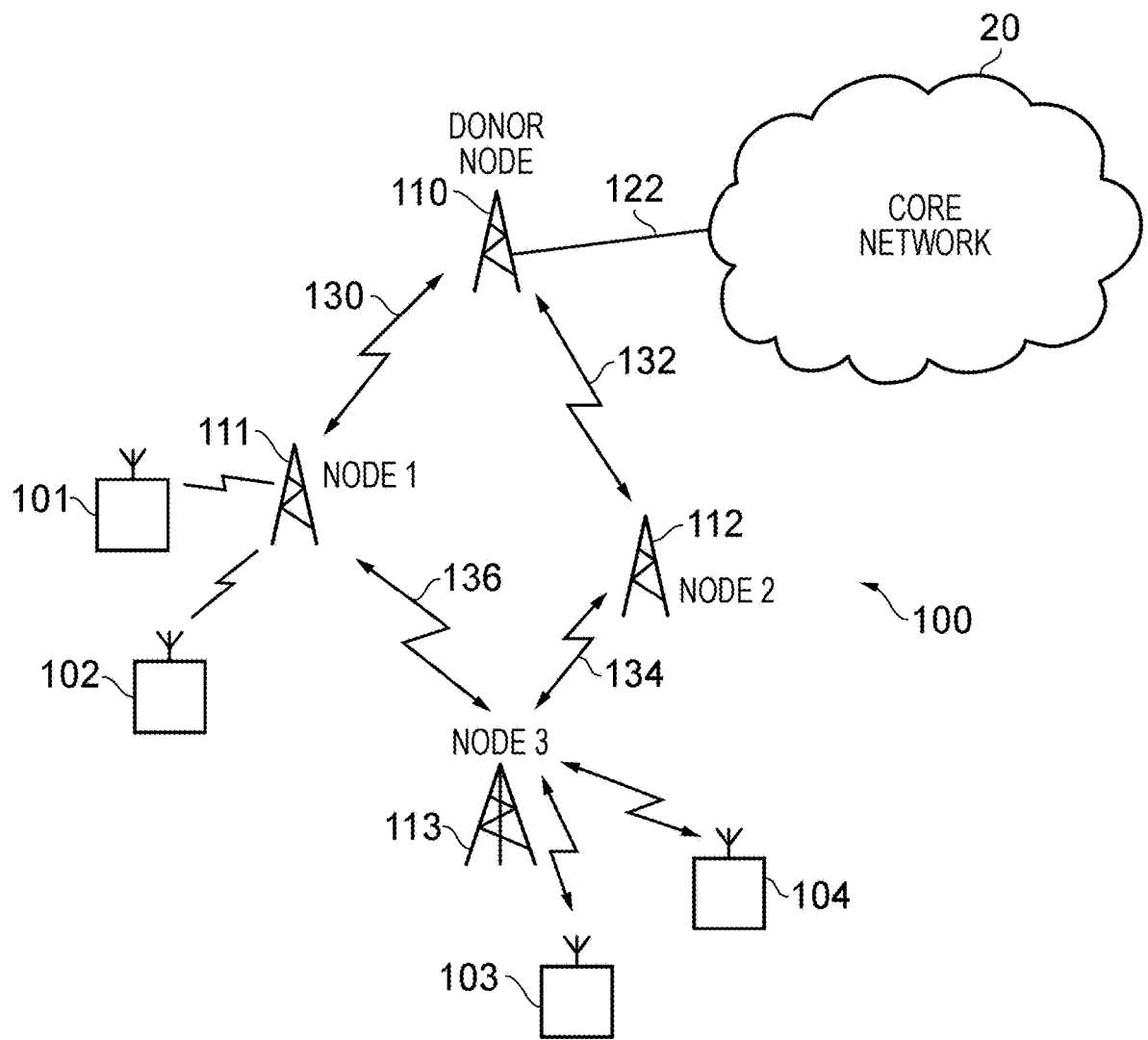
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink data from a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G").

Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
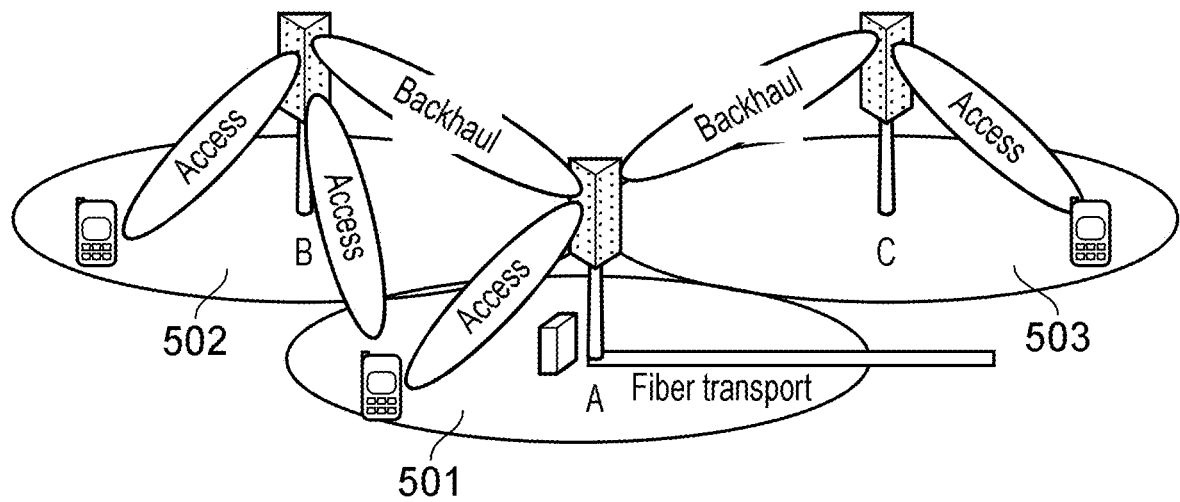
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6:
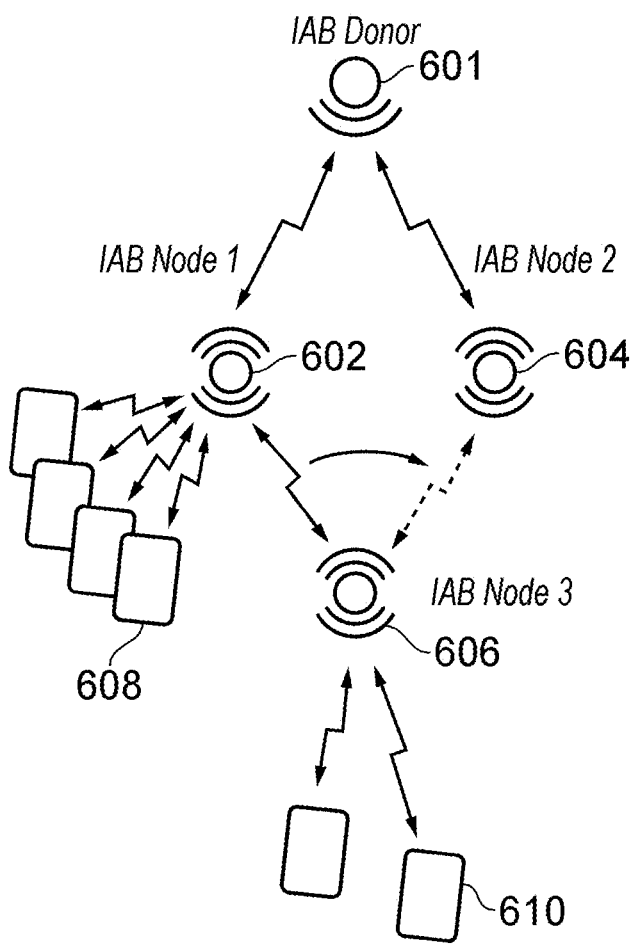
FIG. 6 is reproduced from [5], and provides a second example of an IAB deployment scenario in which there are multiple candidate routes each comprising multiple hops from the end node to the donor node.

FIG. 6 is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node)

which has a backhaul connection to each of the first IAB node 602 and the second IAB node 604. Each of the first IAB node 601 and third IAB node 606 have wireless access connections to UEs 608 and 610 respectively. As shown in FIG. 6, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link. Hence, knowing how to manage the candidate routes efficiently and effectively is important to ensure timely data transmission between relay nodes, especially when considering the characteristics of wireless links.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
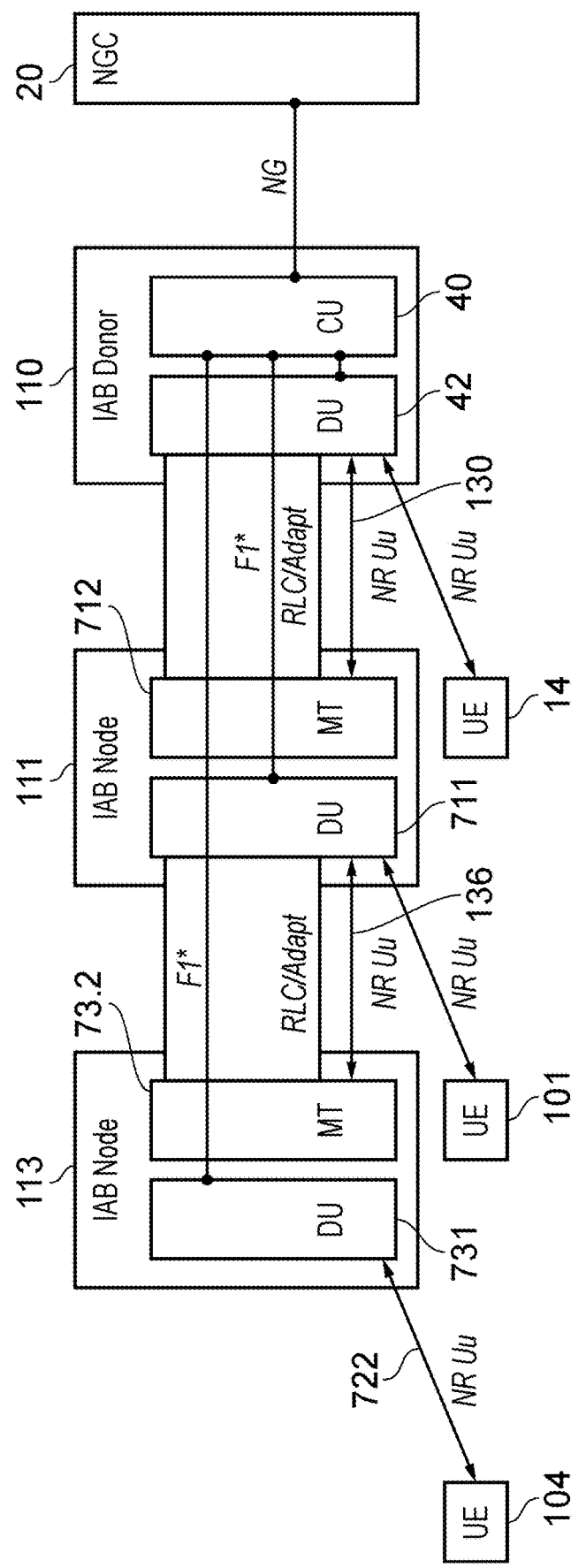
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Figure 8:
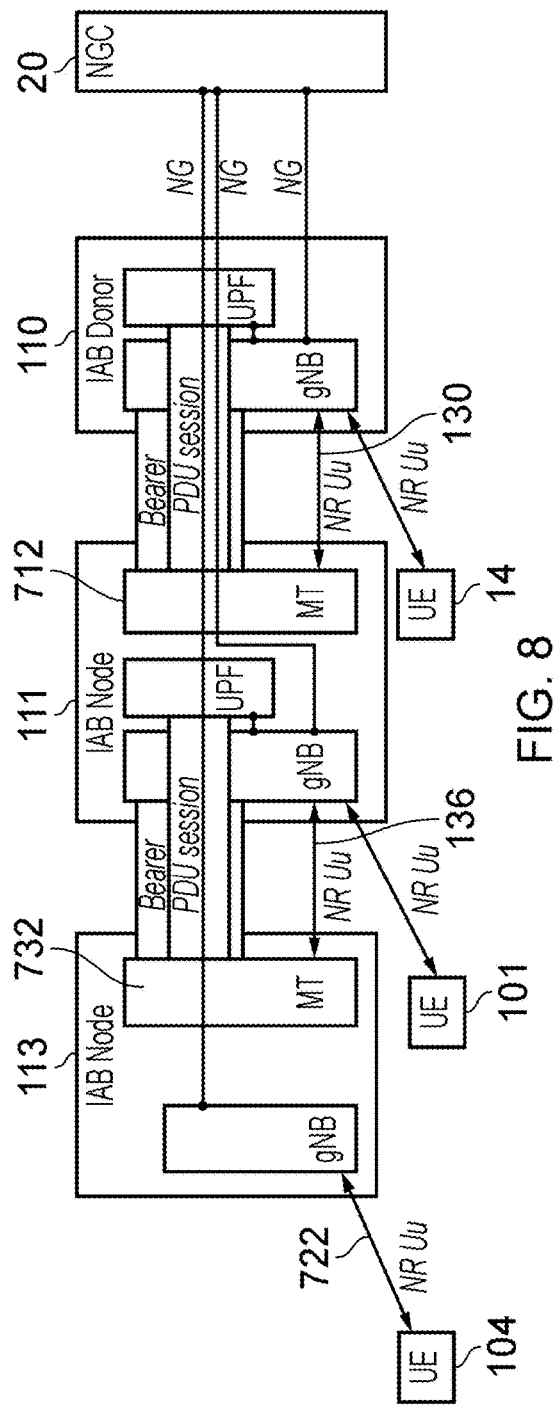
FIG. 8 is a block diagram illustrating a second possible network architecture for providing a wireless backhaul by means of IAB in a wireless telecommunication network which may be configured to operate in accordance with certain embodiments of the present disclosure.
Figure 9:
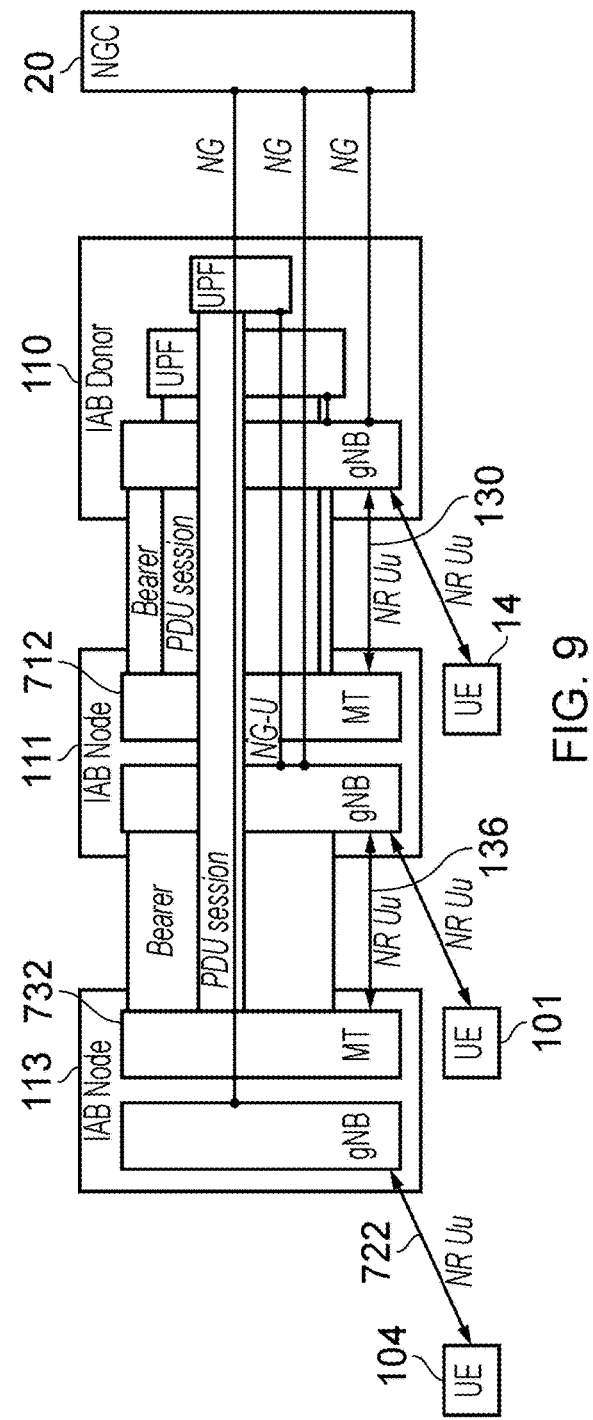
FIG. 9 is a block diagram illustrating a third possible network architecture for providing a wireless backhaul by means of IAB in a wireless telecommunication network which may be configured to operate in accordance with certain embodiments of the present disclosure.

Alternative candidate architectures for the provision of IAB are provided in FIG. 8 and FIG. 9. In both FIG. 8 and FIG. 9, each IAB node includes a gNB function, providing a wireless access interface for the use of downstream IAB nodes and wireless communications devices. FIG. 9 differs from FIG. 7 in that, in FIG. 7, PDU sessions are connected end-on-end to form the wireless backhaul; in FIG. 9, PDU sessions are encapsulated so that each IAB node may establish an end-to-end PDU session which terminates at the IAB donor node 110.

Given the vulnerable characteristics of wireless links, and considering multi-hops on the backhaul link, topology adaptation should be considered in the case that blockages or congestion occur in the backhaul link considering a given hop. It is therefore imperative to maximise the spectral efficiency of the backhaul link in order to maximise its capacity. Embodiments of the present technique seek to address how the capacity of the backhaul link can be increased.

In FIG. 6, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6 is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent QoS requirements that translate into high traffic intensities.

Even more challenging is that the last hop in the backhaul link, such as that between the first IAB Node 602 and the IAB Donor node 601 now has even more stringent capacity needs since it has to backhaul UE traffic from both groups of UEs 608 and 610. Embodiments of the present technique are directed to increasing as much as possible the spectral efficiency in the use of the limited radio resources assigned for backhaul, so as to mitigate the capacity crunch on the IAB backhaul.

Spectral Efficiency for the IAB Links in NR

Figure 10:
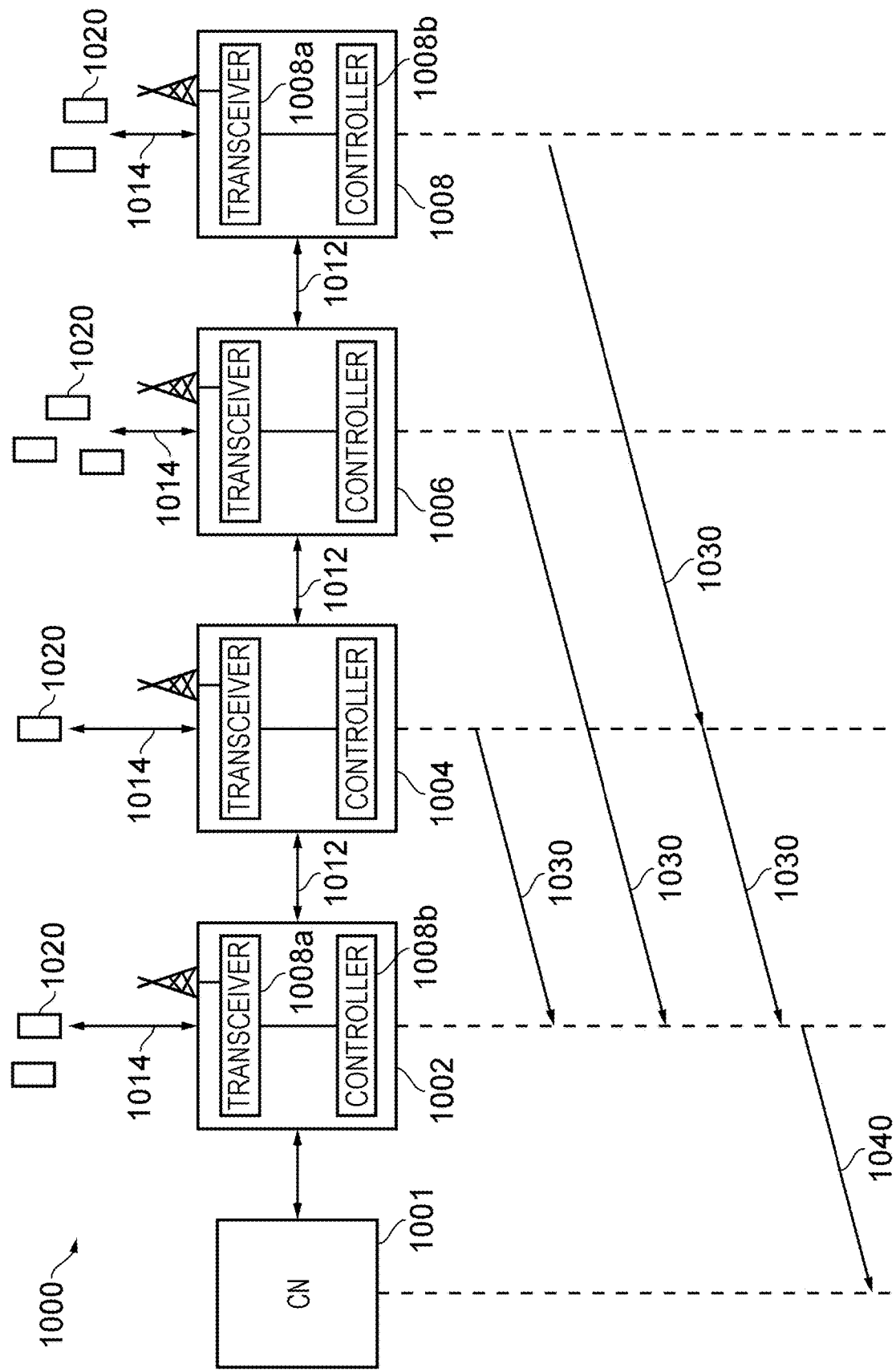
FIG. 10 shows a part schematic, part message flow diagram of communications in a wireless communications system in accordance with embodiments of the present technique.

FIG. 10 shows a part schematic, part message flow diagram of communications in a wireless communications network 1000 in accordance with embodiments of the present technique. The wireless communications network 1000 comprises a plurality of infrastructure equipment 1002, 1004, 1006, 1008 each being configured to communicate with one or more others of the infrastructure equipment 1002, 1004, 1006, 1008 via a backhaul communications link 1012, one or more of the infrastructure equipment 1002, 1004, 1006, 1008 each being configured to communicate with one or more communications devices 1020 via an access link 1014. A first of the infrastructure equipment 1002 is configured to act as a donor node connected to a core network part 1001 of the wireless communications network 1000 and comprises transceiver circuitry 1002a and controller circuitry 1002b configured in combination to receive 1030, at the first infrastructure equipment 1002, signals representing data from one or more others of the infrastructure equipment 1004, 1006, 1008 the data having been received at the one or more others of the infrastructure equipment 1004, 1006, 1008 from one or more of the communications devices 1020 or from other infrastructure equipment 1004, 1006, 1008, and to transmit 1040, by the first infrastructure equipment 1002, the data from the one or more others of the infrastructure equipment 1004, 1006, 1008 to the core network part 1001 of the wireless communications network 1000, wherein at least one of the infrastructure equipment 1002, 1004, 1006, 1008 is configured to use at least one spectral efficiency enhancing technique to receive the signals, the at least one spectral efficiency enhancing technique allowing the at least one infrastructure equipment 1002, 1004, 1006, 1008 to receive the signals in the backhaul communications link, the at least one spectral efficiency enhancing technique not allowing the at least one infrastructure equipment 1002, 1004, 1006, 1008 to receive the signals in the access link.

All of the IAB relay nodes shown in FIG. 6 (such as the third IAB Node 606), the hop nodes (such as the first IAB Node 602) and donor nodes (e.g. node 601) are gNBs that are physically fixed and not moving. It is therefore expected that the backhaul link between the end node and the hop or donor nodes would essentially be fixed. Such fixed links may potentially have a line of sight (LoS) as well. As the link is fixed, propagation conditions can be significantly improved by use of beam forming. Beam forming focuses all the power of the signal in a thin beam to maximize its directivity. In other words, the at least one spectral efficiency enhancing technique comprises receiving the signals using one or more beams, beam-formed specifically for the purpose, in which power of each of the signals is focused, each of the one or more beams being separately identifiable and forming a directional bias with respect to the at least one infrastructure equipment.

In this arrangement, the fact that the beam forming increases the transmitter directivity and so reduces the impact of free space loss is exploited, leading to a high signal to interference and noise power ratio (SINR) at the IAB backhaul link receiver. In this arrangement, a high order modulation and coding scheme (MCS) that incorporates higher order modulation schemes such as $2^m$-QAM where m has a value of 10 or more and higher Forward Error Code (FEC) code rates are used for such links. With such MCS with $2^m$-QAM modulation and r code rate, each resource element (RE) allocated to the backhaul link will carry as many as rm information bits, increasing proportionately as either m or r is increased and so maximize the spectral efficiency of the backhaul because of the benign propagation conditions. In other words, the data may be modulated onto the signals with a higher order modulation scheme than if the at least one spectral efficiency enhancing technique was not used to receive the signals. The signals may be transmitted with a higher code rate than if the at least one spectral efficiency enhancing technique was not used to receive the signals.

In another arrangement, spectral efficiency of the backhaul link especially from one hop to the next is improved by increasing the size of transmission resources that can be allocated in a resource allocation event. This is achieved through slot aggregation. In other words, the at least one spectral efficiency enhancing technique comprises transmitting, by the at least one infrastructure equipment to the one or more other infrastructure equipment, an indication that the one or more other infrastructure equipment may allocate a larger amount of radio resources for the backhaul communications link than compared to the radio resources for the access link, the larger amount of radio resources being allocated by aggregating a plurality of smaller units of radio resources.

Slot aggregation builds bigger transmission slots comprised of a plurality of slots. For example, while a normal slot may be configured as comprised of a certain number of subcarriers (e.g. 12 subcarriers) over N symbols, an aggregated slot in Rel 15 NR may comprise 2, 4, or 8 such normal slots and so lasts for 2N, 4N, or 8N symbols as the case may be. In Rel 15 NR, a slot in a time domain consists of 14 symbols (i.e. N=14). Slot aggregation allows the carriage of larger transmission blocks, thereby saving the resources that may have been used for, say, the multiple slot header information of the aggregated normal slots such as the PDCCH and a group-common PDCCH conveying a slot format information (SFI) etc. to be used for the traffic channels, further maximizing the spectral efficiency. Rel 15 NR allows slot aggregation only for the down-link (DL). This arrangement also includes slot aggregation on the up-link (UL) since the capacity crunch on the backhaul link is present both for the DL and the UL.

Furthermore, it is possible to configure different slot aggregation factors for the DL and the UL. For example, in a session when a UE connected to the end node is streaming video from the Internet, the DL traffic flow is more intensive than the UL traffic flow which in this case may simply be made up of interactive commands such as PAUSE, PLAY etc. In this example, the down backhaul link (donor to hop or end node) could be configured to use a higher slot aggregation factor of 8 while the up backhaul link (end node to hop or donor node) could be configured to use a lower slot aggregation factor of 2. The situation could be reversed with a lower aggregation factor for the DL than the UL in sessions in which the said UE is uploading video clips to a website for example. Furthermore, the configurable number of aggregated slots can be increased for the down backhaul link and the up backhaul link. For example, while the configurable number of aggregated slots for conventional downlink (i.e. access link) is chosen from a list comprising {2, 4, 8}, the list of configurable number of slots for the down/up backhaul link can be different and include larger numbers for example {4,8,16,32}. Limiting to not more than 4 entries allows the same number of signalling bits to be used both for the access and backhaul links. The list can be made longer such as {2,4,8,16,32,64,128,256}. However, this requires an increase of one bit in the configuration signalling field. With an extended or new list for configuring the aggregation factor of the backhaul link, larger aggregation factors are made available for configuring the backhaul link.

In another arrangement, the fact that the highly directive signal produced by a technique such as beam forming results in very little multipath at the receiver is exploited. Furthermore, the stationarity of both the transmitter and receiver at each end of the backhaul link also means that there is very little time variation to the power of the signal at the antenna of the receiver. This arrangement exploits the low frequency selectivity (due to the reduced multipath) and the lack of time variation on the channel to reduce the density of the reference symbols such as sounding reference signals (SRS) or demodulation reference signals (DM-RS) transmitted for use in channel estimation for a physical channel (for example, a physical downlink shared channel (PDSCH) and a physical uplink shared channel (PUSCH)) in the backhaul link. In other words, the at least one spectral efficiency enhancing technique comprises transmitting the signals by the one or more others of the infrastructure equipment and/or the one or more of the communications devices with a smaller density DM-RS in the frequency domain on the backhaul communications link than compared to on the access link.

For example, if the DM-RS frequency domain density for the access link is 1 in 4 subcarriers and compared to the access link, the multipath delay spread is halved on the backhaul link, then the DM-RS frequency domain density can be reduced by half to 1 in 8 subcarriers for the backhaul link. Rel-15 NR defines two configurable DM-RS densities for the access link: 1 in 4 and 1 in 6 subcarriers in the frequency domain. Lower densities will be defined for the backhaul such as 1 in $N_1$ and 1 in $N_2$ where $N_1$=4K and $N_2$=8K where K is a small integer. In addition, lower densities will be defined such as 1 in 12K subcarriers where K is a small integer (i.e. 1 in K resource block). The density of DM-RS determines the maximum number of layers for MIMO (spatial) multiplexing. The reduced density can be exploited to increase the number of spatial layers in the backhaul links. In other words, the at least one spectral efficiency enhancing technique comprises increasing a maximum number of layers onto which the signals can be multiplexed in the backhaul links using a multiple-input and multiple-output, MIMO, multiplexing process. In the current 3GPP specifications, where DM-RS densities can be configured to be 1 in 4 or 1 in 6, the maximum layers are 8 and 12 respectively. Therefore when the lower densities are configured for backhaul link, the maximum layers can be increased. For example, when DM-RS density is 1 in X subcarriers, the maximum layers can be 2X. The DM-RS density on the backhaul link in the frequency domain can be fixed to the lowest density from a plurality of predefined, configurable densities on the access link.

Further, slot aggregation produces long slots with many DM-RS in the time domain. This arrangement also benefits from the low time variation in the channel to reduce the time domain density of DM-RS. In Rel-15 NR, the number of positions for DL time domain DM-RS can be 1, 2, 3 and 4 within 1 slot (14 symbols). In other words, the at least one spectral efficiency enhancing technique comprises transmitting the signals by the one or more others of the infrastructure equipment with a smaller density of demodulation reference signals, DM-RS, in the time domain on the backhaul communications link than compared to on the access link. In this arrangement and taking into account increased slot aggregation, the configurable number of positions can be restricted to only 1 for backhaul link (i.e. RRC parameter "DL-DMRS-add-pos" can be configured with only 1). Furthermore, while DM-RS for the access link in the Rel 15 NR is mapped in every slot even in the case of the slot aggregation, DM-RS for backhaul link with slot aggregation can be reduced in time domain. For example, when Y slots are aggregated for backhaul link, the number of positions for time domain DM-RS can be less than Y (e.g. 1) within Y aggregated slots. The number of positions can be implicitly determined by the number of aggregated slots or can be explicitly signalled for example, via an RRC parameter and/or a downlink control information (DCI) which is conveyed by PDCCH. The DM-RS density on the backhaul link in the time domain can also be fixed to the lowest density from a plurality of pre-defined, configurable densities available for use in the access link. This has the advantage of limiting changes in the Rel 15 signalling.

The above described arrangements—especially the ones related to DM-RS density reduction are based on orthogonal frequency or orthogonal time IAB-access resource partitioning schemes between backhaul and access links such as TDM and FDM in the same specific resource such as a component carrier (CC) or a bandwidth part (BWP). The DM-RS density reduction arrangements may be not suitable for space division multiplexing (SDM) schemes such as MU-MIMO in which SDM is applied between access and backhaul. In other words, radio resources for the backhaul link and radio resources for the access link may be separated from one another in either or both of the time domain and the frequency domain. The above described arrangements may also be applied to SDM. Resources may be preferentially allocated for the backhaul link over the access link.

Flow Chart Representation

Figure 11:
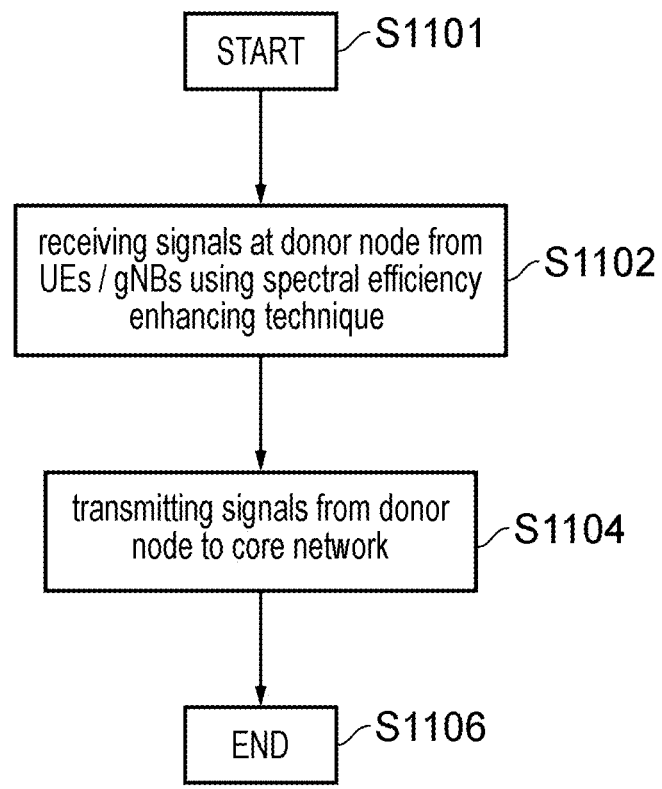
FIG. 11 shows a flow diagram illustrating a process of communications in a communications system in accordance with embodiments of the present technique.

FIG. 11 shows a flow diagram illustrating a process of communications in a communications system in accordance with embodiments of the present technique. The process shown by FIG. 11 is a method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link.

The method begins in step S1101. The method comprises, in step S1102, receiving, at a first of the infrastructure equipment acting as a donor node connected to a core network part of the wireless communications network, signals representing data from one or more others of the infrastructure equipment, the data having been received at the one or more others of the infrastructure equipment from one or more of the communications devices or from other infrastructure equipment. At least one of the infrastructure equipment uses at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link. The process proceeds to step S1104, which comprises t transmitting, by the first infrastructure equipment, the data from the one or more others of the infrastructure equipment to the core network part of the wireless communications network. The process ends in step S1106.

Those skilled in the art would appreciate that the method shown by FIG. 11 may be adapted in accordance with embodiments of the present technique. For example, other intermediate steps may be included in the method, or the steps may be performed in any logical order. In particular, the at least one spectral efficiency enhancing technique used for communication between the donor node and the one or more others of the infrastructure equipment would have been originally configured for use during the initial setup of the backhaul link either when the downstream node was originally turned on or when the current session started or as part of radio link adaptation process. The at least one spectral efficiency enhancing technique may be used for the links between any two infrastructure equipment in the wireless communications network. For example, this may be between the donor node and end node, donor node and a hop (relay) node, two hop nodes, or a hop node and end node.

Though embodiments of the present technique have been described largely by way of the example system shown in FIG. 10, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered paragraphs provide further example aspects and features of the present technique:

Paragraph 1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising receiving, at a first of the infrastructure equipment acting as a donor node connected to a core network part of the wireless communications network, signals representing data from one or more others of the infrastructure equipment, the data having been received at the one or more others of the infrastructure equipment from one or more of the communications devices or from other infrastructure equipment, and transmitting, by the first infrastructure equipment, the data from the one or more others of the infrastructure equipment to the core network part of the wireless communications network, wherein at least one of the infrastructure equipment uses at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link.

Paragraph 2. A method according to Paragraph 1, wherein the at least one spectral efficiency enhancing technique comprises receiving the signals using one or more beams in which power of each of the signals is focused, each of the one or more beams being separately identifiable and forming a directional bias with respect to the at least one infrastructure equipment.

Paragraph 3. A method according to Paragraph 2, wherein the data is modulated onto the signals with a higher order modulation scheme than if the at least one spectral efficiency enhancing technique was not used to receive the signals.

Paragraph 4. A method according to Paragraph 2 or Paragraph 3, wherein the signals are transmitted with a higher code rate than if the at least one spectral efficiency enhancing technique was not used to receive the signals.

Paragraph 5. A method according to any of Paragraphs 1 to 4, wherein the at least one spectral efficiency enhancing technique comprises transmitting, by the at least one infrastructure equipment to the one or more other infrastructure equipment, an indication that the one or more other infrastructure equipment may allocate a larger amount of radio resources for the backhaul communications link than compared to the radio resources for the access link, the larger amount of radio resources being allocated by aggregating a plurality of smaller units of radio resources.

Paragraph 6. A method according to any of Paragraphs 1 to 5, wherein the at least one spectral efficiency enhancing technique comprises transmitting the signals by the one or more others of the infrastructure equipment and/or the one or more of the communications devices with a smaller density of demodulation reference signals, DM-RS, in the frequency domain on the backhaul communications link than compared to on the access link Paragraph 7. A method according to Paragraph 5 or Paragraph 6, wherein the at least one spectral efficiency enhancing technique comprises increasing a maximum number of layers onto which the signals can be multiplexed using a multiple-input and multiple-output, MIMO, multiplexing process.

Paragraph 8. A method according to Paragraph 6 or Paragraph 7, wherein the at least one spectral efficiency enhancing technique comprises transmitting the signals on the backhaul communications link with a smallest DM-RS density of a plurality of predefined DM-RS densities of the access link.

Paragraph 9. A method according to any of Paragraphs 1 to 8, wherein the at least one spectral efficiency enhancing technique comprises transmitting the signals by the one or more others of the infrastructure equipment with a smaller density of demodulation reference signals, DM-RS, in the time domain on the backhaul communications link than compared to on the access link.

Paragraph 10. A method according to Paragraph 9, wherein the at least one spectral efficiency enhancing technique comprises transmitting the signals on the backhaul communications link with a smallest time domain DM-RS density of a plurality of predefined time domain DM-RS densities of the access link.

Paragraph 11. A method according to any of Paragraphs 1 to 10, wherein radio resources for the backhaul communications link and radio resources for the access link are separated from one another in the frequency domain.

Paragraph 12. A method according to any of Paragraphs 1 to 11, wherein radio resources for the backhaul communications link and radio resources for the access link are separated from one another in the time domain.

Paragraph 13. A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a first of the infrastructure equipment is configured to act as a donor node connected to a core network part of the wireless communications network and comprises transceiver circuitry and controller circuitry configured in combination to receive, at the first infrastructure equipment, signals representing data from one or more others of the infrastructure equipment, the data having been received at the one or more others of the infrastructure equipment from one or more of the communications devices or from other infrastructure equipment, and to transmit, by the first infrastructure equipment, the data from the one or more others of the infrastructure equipment to the core network part of the wireless communications network, wherein at least one of the infrastructure equipment is configured to use at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link.

Paragraph 14. Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a first of the infrastructure equipment is configured to act as a donor node connected to a core network part of the wireless communications network and comprises transceiver circuitry and controller circuitry configured in combination to receive, at the first infrastructure equipment, signals representing data from one or more others of the infrastructure equipment, the data having been received at the one or more others of the infrastructure equipment from one or more of the communications devices or from other infrastructure equipment, and to transmit, by the first infrastructure equipment, the data from the one or more others of the infrastructure equipment to the core network part of the wireless communications network, wherein at least one of the infrastructure equipment is configured to use at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link.

Paragraph 15. A method of operating a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the first infrastructure equipment is configured to act as a donor node connected to a core network part of the wireless communications network, the method comprising receiving signals representing data from one or more others of the infrastructure equipment, the data having been received at the one or more others of the infrastructure equipment from one or more of the communications devices or from other infrastructure equipment, and transmitting the data from the one or more others of the infrastructure equipment to the core network part of the wireless communications network, wherein at least one of the infrastructure equipment uses at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link.

Paragraph 16. A first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the first infrastructure equipment is configured to act as a donor node connected to a core network part of the wireless communications network and comprises transceiver circuitry and controller circuitry configured in combination to receive signals representing data from one or more others of the infrastructure equipment, the data having been received at the one or more others of the infrastructure equipment from one or more of the communications devices or from other infrastructure equipment, and to transmit the data from the one or more others of the infrastructure equipment to the core network part of the wireless communications network, wherein at least one of the infrastructure equipment is configured to use at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link.

Paragraph 17. Circuitry for a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the first infrastructure equipment is configured to act as a donor node connected to a core network part of the wireless communications network and comprises transceiver circuitry and controller circuitry configured in combination to receive signals representing data from one or more others of the infrastructure equipment, the data having been received at the one or more others of the infrastructure equipment from one or more of the communications devices or from other infrastructure equipment, and to transmit the data from the one or more others of the infrastructure equipment to the core network part of the wireless communications network, wherein at least one of the infrastructure equipment is configured to use at least one spectral efficiency enhancing technique to receive the signals, the at least one spectral efficiency enhancing technique allowing the at least one infrastructure equipment to receive the signals in the backhaul communications link, the at least one spectral efficiency enhancing technique not allowing the at least one infrastructure equipment to receive the signals in the access link.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170831, "New SID Proposal: Study on Integrated Access and Backhaul for NR", AT&T, 3GPP RAN Meeting #75, Dubrovnik, Croatia, March 2017.
[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.
[5] R2-1801606, "Proposals on IAB Architecture", Qualcomm et al, 3GPP TSG-RAN WG2 NR Ad hoc 1801, Vancouver, Canada, Jan. 22-26, 2018.
[6] R3-181502, "Way Forward—IAB Architecture for L2/3 relaying", Qualcomm et al, 3GPP TSG RAN WG3 Meeting #99, 2018

What is claimed is:

1. A wireless communications network, comprising:
a plurality of infrastructure equipment each being configured to communicate with one or more others of the infrastructure equipment via a backhaul communications link, one or more of the infrastructure equipment each being configured to communicate with one or more communications devices via an access link, wherein a first of the infrastructure equipment is configured to act as a donor node connected to a core network part of the wireless communications network,
wherein the first infrastructure equipment comprises circuitry configured to
use at least one spectral efficiency enhancing technique to receive signals representing data from one or more others of the infrastructure equipment, the at least one spectral efficiency enhancing technique allowing the infrastructure equipment to receive the signals in the backhaul communications link, the at least one spectral efficiency enhancing technique not allowing the infrastructure equipment to receive the signals in the access link,
wherein the at least one spectral efficiency enhancing technique comprises transmitting by the infrastructure equipment to the one or more other infrastructure equipment an indication that the one or more other infrastructure equipment allocate, for the up-link and down-link, an increased amount of radio resources for the backhaul communications link than compared to the radio resources for the access link.

2. The wireless communications network of claim 1, wherein the at least one spectral efficiency enhancing technique comprises receiving the signals using one or more beams in which power of each of the signals is focused, each of the one or more beams being separately identifiable and forming a directional bias with respect to the at least one infrastructure equipment.

3. The wireless communications network of claim 2, wherein the data is modulated onto the signals with a higher order modulation scheme than when the at least one spectral efficiency enhancing technique was not used to receive the signals.

4. The wireless communications network of claim 2, wherein the signals are transmitted with a higher code rate than when the at least one spectral efficiency enhancing technique was not used to receive the signals.

5. The wireless communications network of claim 1, wherein the increased amount of radio resources being allocated to the one or more other infrastructure equipment by aggregating a plurality of smaller units of radio resources.

6. The wireless communications network of claim 5, wherein the at least one spectral efficiency enhancing technique comprises increasing a maximum number of layers onto which the signals are multiplexed using a multiple-input and multiple-output, MIMO, multiplexing process.

7. The wireless communications network of claim 1, wherein the at least one spectral efficiency enhancing technique comprises transmitting the signals by the one or more others of the infrastructure equipment and/or the one or more of the communications devices with a smaller density of demodulation reference signals, DM-RS, in the frequency domain on the backhaul communications link than compared to on the access link.

8. The wireless communications network of claim 7, wherein the at least one spectral efficiency enhancing technique comprises transmitting the signals on the backhaul communications link with a smallest DM-RS density of a plurality of predefined DM-RS densities of the access link.

9. The wireless communications network of claim 1, wherein the at least one spectral efficiency enhancing technique comprises transmitting the signals by the one or more others of the infrastructure equipment with a smaller density of demodulation reference signals, DM-RS, in the time domain on the backhaul communications link than compared to on the access link.

10. The wireless communications network of claim 9, wherein the at least one spectral efficiency enhancing technique comprises transmitting the signals on the backhaul communications link with a smallest time domain DM-RS density of a plurality of predefined time domain DM-RS densities of the access link.

11. The wireless communications network of claim 1, wherein radio resources for the backhaul communications link and radio resources for the access link are separated from one another in the frequency domain.

12. The wireless communications network of claim 1, wherein radio resources for the backhaul communications link and radio resources for the access link are separated from one another in the time domain.

13. Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a first of the infrastructure equipment is configured to act as a donor node connected to a core network part of the wireless communications network and comprises transceiver circuitry and controller circuitry configured in combination:
to use at least one spectral efficiency enhancing technique to receive signals representing data from one or more others of the infrastructure equipment, the at least one spectral efficiency enhancing technique allowing the infrastructure equipment to receive the signals in the backhaul communications link, the at least one spectral efficiency enhancing technique not allowing the infrastructure equipment to receive the signals in the access link, wherein the at least one spectral efficiency enhancing technique comprises transmitting, by the infrastructure equipment to the one or more other infrastructure equipment, an indication that the one or more other infrastructure equipment allocate, for the up-link and down-link, an increased amount of radio resources for the backhaul communications link than compared to the radio resources for the access link.

14. Circuitry for a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the first infrastructure equipment is configured to act as a donor node connected to a core network part of the wireless communications network and comprises transceiver circuitry and controller circuitry configured in combination:

to use at least one spectral efficiency enhancing technique to receive the signals representing data from one or more others of the infrastructure equipment, the at least one spectral efficiency enhancing technique allowing the infrastructure equipment to receive the signals in the backhaul communications link, the at least one spectral efficiency enhancing technique not allowing the infrastructure equipment to receive the signals in the access link, wherein the at least one spectral efficiency enhancing technique comprises transmitting, by the infrastructure equipment to the one or more other infrastructure equipment, an indication that the one or more other infrastructure equipment allocate, for the up-link and down-link, an increased amount of radio resources for the backhaul communications link than compared to the radio resources for the access link.

15. The circuitry for the first infrastructure equipment of claim 14, wherein the at least one spectral efficiency enhancing technique comprises receiving the signals using one or more beams in which power of each of the signals is focused, each of the one or more beams being separately identifiable and forming a directional bias with respect to the at least one infrastructure equipment.

16. The circuitry for the first infrastructure equipment of claim 15, wherein the data is modulated onto the signals with a higher order modulation scheme than when the at least one spectral efficiency enhancing technique was not used to receive the signals.

17. The circuitry for the first infrastructure equipment of claim 15, wherein the signals are transmitted with a higher code rate than when the at least one spectral efficiency enhancing technique was not used to receive the signals.

18. The circuitry for the first infrastructure equipment of claim 14, wherein the increased amount of radio resources being allocated to the one or more other infrastructure equipment by aggregating a plurality of smaller units of radio resources.

19. The circuitry for the first infrastructure equipment of claim 18, wherein the at least one spectral efficiency enhancing technique comprises increasing a maximum number of layers onto which the signals are multiplexed using a multiple-input and multiple-output, MIMO, multiplexing process.

20. The circuitry for the first infrastructure equipment of claim 14, wherein the at least one spectral efficiency enhancing technique comprises transmitting the signals by the one or more others of the infrastructure equipment and/or the one or more of the communications devices with a smaller density of demodulation reference signals, DM-RS, in the frequency domain on the backhaul communications link than compared to on the access link.

* * * * *